(12) United States Patent
Wang et al.

(10) Patent No.: US 9,304,792 B2
(45) Date of Patent: Apr. 5, 2016

(54) DECOUPLED METHOD FOR TRACKING INFORMATION FLOW AND COMPUTER SYSTEM THEREOF

(75) Inventors: Chi-Wei Wang, Hsinchu (TW);
Shiuh-Pyng Shieh, Hsinchu (TW);
Yen-Ju Liu, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 1011 days.

(21) Appl. No.: 13/459,258

(22) Filed: Apr. 30, 2012

(65) Prior Publication Data

US 2013/0185523 A1 Jul. 18, 2013

(30) Foreign Application Priority Data

Jan. 12, 2012 (TW) .............................. 101101270 A

(51) Int. Cl.
*G06F 12/00* (2006.01)
*G06F 13/00* (2006.01)
*G06F 13/28* (2006.01)
*G06F 9/455* (2006.01)

(52) U.S. Cl.
CPC .................................. *G06F 9/4552* (2013.01)

(58) Field of Classification Search
CPC ...................................................... G06F 9/4552
USPC ........................................................ 711/147
See application file for complete search history.

(56) References Cited

U.S. PATENT DOCUMENTS

| 5,278,901 A | 1/1994 | Shieh et al. | |
| 2002/0056075 A1* | 5/2002 | Hamilton et al. | ............. 717/110 |
| 2003/0120897 A1* | 6/2003 | Schlansker | ................... 712/200 |
| 2005/0071602 A1* | 3/2005 | Niell et al. | ..................... 712/202 |
| 2007/0240141 A1* | 10/2007 | Qin et al. | ...................... 717/158 |
| 2009/0172644 A1* | 7/2009 | Nagarajan et al. | ............ 717/128 |
| 2009/0183261 A1 | 7/2009 | Peinado et al. | |
| 2010/0325359 A1 | 12/2010 | Goel et al. | |
| 2011/0277038 A1 | 11/2011 | Sahita et al. | |

OTHER PUBLICATIONS

"Office Action of Taiwan Counterpart Application," issued on Oct. 17 2015, p1-p10, in which the listed references were cited.

* cited by examiner

*Primary Examiner* — Charles Rones
*Assistant Examiner* — Sidney Li
(74) *Attorney, Agent, or Firm* — Jianq Chyun IP Office

(57) ABSTRACT

A computer system and a method for tracking information flow are provided. The computer system divides an information flow tracking task into two decoupled tasks executed by two procedures. The first procedure emulates execution of instructions and divides the instructions into code blocks according to an instruction executing sequence. The first procedure translates the instructions of the code blocks into information flow codes and transmits them to the second procedure. The first procedure further translates the instructions into dynamic emulation instructions and executes the dynamic emulation instructions to generate addressing results of the dynamic addressing instructions. The second procedure executes the information flow codes according to the addressing results to emulate the instructions of the code blocks. Moreover, the method also tries to reduce the amount of data transmission between the two procedures when the first procedure executes the emulation task. Therefore, the efficiency of tracking information flow is enhanced.

26 Claims, 11 Drawing Sheets

| Category | information flow | labeled symbol |
|---|---|---|
| 410 Byte-wise Overwriting | $A[0] \leftarrow B[0]$<br>$A[1] \leftarrow B[1]$<br>$\vdots$<br>$A[n] \leftarrow B[n]$ | $A \overset{}{\Longleftarrow} nB$ |
| 420 Byte-wise Appending | $A[0] \overset{+}{\leftarrow} B[0]$<br>$A[1] \overset{+}{\leftarrow} B[1]$<br>$\vdots$<br>$A[n] \overset{+}{\leftarrow} B[n]$ | $A \overset{+}{\Longleftarrow} nB$ |
| 430 Incrementally Mixed | $A[0] \overset{+}{\leftarrow} B[0]$<br>$A[1] \overset{+}{\leftarrow} A[0], A[1] \overset{+}{\leftarrow} B[1]$<br>$A[2] \overset{+}{\leftarrow} A[1], A[2] \overset{+}{\leftarrow} B[2]$<br>$\vdots$<br>$A[n] \overset{+}{\leftarrow} A[n-1], A[n] \overset{+}{\leftarrow} B[n]$ | $A \overset{A}{\Longleftarrow} nB$ |
| 440 All Mixed-up | $T \leftarrow A[0], T \overset{+}{\leftarrow} A[1], \cdots, T \overset{+}{\leftarrow} A[n]$<br>$T \overset{+}{\leftarrow} B[0], T \overset{+}{\leftarrow} B[1], \cdots, T \overset{+}{\leftarrow} B[n]$<br>$A[0] \leftarrow T, A[1] \leftarrow T, \cdots, A[n] \leftarrow T$<br>$B[0] \leftarrow T, B[1] \leftarrow T, \cdots, B[n] \leftarrow T$ | $A \overset{+}{\Longleftarrow} nB$ |

FIG. 4

Input:
   offset: offset encoded in EBP-based accessing instruction
   ebp: current value of EBP register
   paddr_base: physical address of base page.
   paddr_siding: physical address of siding page Output:
   physical address accessed by this instruction Algorithm:
PAGEMASK = 0xFFFFF000
901 → if ((ebp & PAGEMASK) != (ebp+offset) & PAGEMASK)
902 →    return paddr_siding + ((ebp+offset) & ~PAGEMASK)
else
903 →    return paddr_base + ((ebp+offset) & ~PAGEMASK)

FIG. 9

DECOUPLED METHOD FOR TRACKING INFORMATION FLOW AND COMPUTER SYSTEM THEREOF

CROSS-REFERENCE TO RELATED APPLICATION

This application claims the priority benefit of Taiwan application serial no. 101101270, filed on Jan. 12, 2012. The entirety of the above-mentioned patent application is hereby incorporated by reference herein and made a part of this specification.

BACKGROUND OF THE INVENTION

1. Field of the Invention

The present invention relates to a technology for tracking information flow, and more particularly, to a method for tracking information flow in which a task of tracking information flow is divided into two parts that are executed by two procedures and a computer system for executing the method.

2. Description of Related Art

Following the development of network technology, data transmission between computers is becoming more and more popular, such that most computers have been connected to the Internet. This is also accompanied by the risk of network attack. That is, a computer may receive untrust data and execution of the untrust data may result in confidential data of this computer system being stolen or the computer being used for further network attack. There are two conventional methods for addressing this issue. In one method, the computer system is installed with software for detection of malicious program, which can effectively detect various statuses in the computer system (e.g. execution of the instructions or usage of the memory). However, the detection software is closely coupled with the computer system, such that the malicious program can easily bypass the detection software. The other method is to execute the detection software outside the computer system and block all network connecting operations in this computer system. This method can prevent the malicious program from bypassing the detection software but has a poor idea of the statuses in the computer system. Each method has its own advantages and shortcomings. However, a further method has also been proposed, in which a virtual machine is installed in the computer system and an operating system is executed on the virtual machine. The detection software is executed at the virtual machine monitor (VMM) level. As such, the detection software is able to get a whole idea of the status of any malicious program in the operating system without being detected and bypassed by the malicious program.

However, the method of executing the detection software in the VMM system has a performance issue. The detection software must completely emulate the execution of every instruction in the operating system to detect a register, memory or hard disk that is tainted by the malicious program. That is, one instruction may be executed twice, with one time for normal execution, and the other time for emulating the instruction and tracking the information flow of this instruction. Therefore, what is concerned by researchers in this area is how to effectively track the information flow.

SUMMARY OF THE INVENTION

Accordingly, the present invention is directed to a decoupled method and computer system for tracking information flow, which can track information flow with enhanced efficiency.

One embodiment of the present invention provides a decoupled method for tracking information flow, adapted for a computer system including a first procedure and a second procedure. In this method, the first procedure receives multiple instructions. The first procedure divides the instructions into at least one code block according to an executing sequence of the instructions, and the instructions of the code block include a plurality of dynamic addressing instructions and a plurality of static addressing instructions. The first procedure translates the instructions of the code block into a plurality of information flow codes of the code block, and the information flow codes correspond to the instructions of the code block. The first procedure also translates the instructions of the code block into a plurality of dynamic emulation instructions of the code block. The first procedure transmits the information flow codes to the second procedure. The first procedure generates a plurality of addressing results of the dynamic addressing instructions by executing the dynamic emulation instructions and transmits the addressing results to the second procedure. The second procedure executes the information flow codes to track a plurality of information flows of the instructions of the code block according to the addressing results.

In one embodiment, the computer system includes a shared memory, and the shared memory includes a data structure which is a first-in-first-out queue. In the step of transmitting the addressing results to the second procedure by the first procedure, the first procedure writes the addressing results into the data structure, and the second procedure retrieves the addressing results from the data structure.

In one embodiment, the dynamic emulation instructions of the code block include a plurality of emulation executing instructions, and the emulation executing instructions correspond to the instructions of the code block. Execution of the emulation executing instructions by the first procedure is equivalent to execution of the corresponding instructions and generates the addressing results of the dynamic addressing instructions.

In one embodiment, the dynamic emulation instructions of the code block include a plurality of addressing result transmitting instructions, and execution of the addressing result transmitting instructions by the first procedure transmits the addressing results to the second procedure.

In one embodiment, the dynamic emulation instructions of the code block include a plurality of counting instructions, execution of the counting instructions by the first procedure calculates a number of the instructions, and the number of the instructions is the number of the emulation executing instructions of the code block that have been successfully executed.

In one embodiment, the dynamic emulation instructions of the code block include an instruction number transmitting instruction, and execution of the instruction number transmitting instruction by the first procedure transmits the number of the instructions to the second procedure.

In one embodiment, the dynamic emulation instructions of the code block include a block serial number transmitting instruction, and execution of the block serial number transmitting instruction by the first procedure transmits a block serial number of the code block to the shared memory.

In one embodiment, in the step of executing the information flow codes according to the addressing results by the second procedure, the second procedure determines a sequence of tracking the information flows of the code block according to the block serial number, and the second procedure tracks the information flows of the code block according to the number of the instructions.

In one embodiment, the information flow codes comply with a multi-byte format. The multi-byte format includes a source operand format field, a target operand format field, a width field, an effect field, a source operand field and a target operand field. The source operand format field records whether a source operand is a memory or a register. The target operand format field records whether a target operand is a memory or a register. The width field records an operation width of an operator. The effect field records an operation type of the operator. The source operand field records the source operand. The target operand field records the target operand.

In one embodiment, the information flow codes comply with a single-byte format. The single-byte format includes an effect field, a source operand format field, a source operand field, a source operand offset field, a target operand format field, a target operand field and a target operand offset field. The effect field records an operation type of an operator. The source operand format field records whether a source operand is a memory or a register. The source operand field records the source operand. The source operand offset field records an offset amount of the source operand. The target operand format field records whether the target operand is a memory or a register. The target operand field records the target operand. The target operand offset field records an offset amount of the target operand.

In one embodiment, the computer system includes a loop register, and a value of the loop register corresponds to a base page. A plurality of virtual pages adjacent the base page includes a siding page. In the tracking method, when the value of the loop register changes, the first procedure further calculates the corresponding base page and the siding page according to the value of the loop register, and transmits the value of the loop register, the physical address of the base page, and the physical address of the siding page to the second procedure.

In one embodiment of the tracking method, the second procedure further calculates the addressing results of the dynamic addressing instructions including the loop register according to the value of the loop register, the physical address of the base page and the physical address of the siding page.

In one embodiment, the computer system utilizes IA-32 CPU architecture, and the loop register is an ebp register.

In one embodiment, the computer system includes a bit mapping chart, and in the tracking method, the second procedure records the addresses of a tainted memory, tainted register or tainted hard disk into the bit mapping chart during tracking the information flows.

Viewed from another angle, one embodiment of the present invention provides a computer system for tracking information flow. The computer system includes a first core and a second core coupled to the first core. The first core receives multiple instructions and divides the instructions into at least one code block according to an executing sequence of the instructions. The instructions of the code block include a plurality of dynamic addressing instructions and a plurality of static addressing instructions. The first core translates the instructions of the code block into a plurality of information flow codes of the code block, the information flow codes corresponding to the instructions of the code block. The first core further translates the instructions of the code block into a plurality of dynamic emulation instructions of the code block, and transmits the information flow codes to the second core of the computer system. The first core further generates a plurality of addressing results of the dynamic addressing instructions by executing the dynamic emulation instructions and transmits the addressing results to the second core. The second core executes the information flow codes to track a plurality of information flows of the instructions of the code block according to the addressing results.

In one embodiment, the computer system further includes a shared memory coupled to the first core and the second core. The shared memory includes a data structure which is a first-in-first-out queue.

In one embodiment, the first core further writes the addressing results into the data structure, and the second core retrieves the addressing results from the data structure.

In one embodiment, the dynamic emulation instructions of the code block include a plurality of emulation executing instructions, the emulation executing instructions correspond to the instructions of the code block, and execution of the emulation executing instructions by the first core is equivalent to execution of the corresponding instructions and generates the addressing results of the corresponding dynamic addressing instructions.

In one embodiment, the dynamic emulation instructions of the code block include a plurality of addressing result transmitting instructions, and execution of the addressing result transmitting instructions by the first core transmits the addressing results to the second core.

In one embodiment, the dynamic emulation instructions of the code block include a plurality of counting instructions, execution of the counting instructions by the first core calculates a number of the instructions, and the number of the instructions is the number of the emulation executing instructions of the at least one code block that have been successfully executed.

In one embodiment, the dynamic emulation instructions of the code block include an instruction number transmitting instruction, and execution of the instruction number transmitting instruction by the first core transmits the number of the instructions to the second core.

In one embodiment, the dynamic emulation instructions of the code block include a block serial number transmitting instruction, and execution of the block serial number transmitting instruction by the first core transmits a block serial number of the at least one code block to the shared memory.

In one embodiment, the second core further determines a sequence of tracking the information flows of the code block according to the block serial number, and the second core tracks the information flows of the code block according to the number of the instructions.

In one embodiment, the information flow codes comply with a multi-byte format. The multi-byte format includes a source operand format field, a target operand format field, a width field, an effect field, a source operand field and a target operand field. The source operand format field records whether a source operand is a memory or a register. The target operand format field records whether a target operand is a memory or a register. The width field records an operation width of an operator. The effect field records an operation type of the operator. The source operand field records the source operand. The target operand field records the target operand.

In one embodiment, the information flow codes comply with a single-byte format. The single-byte format includes an effect field, a source operand format field, a source operand field, a source operand offset field, a target operand format field, a target operand field and a target operand offset field. The effect field records an operation type of an operator. The source operand format field records whether a source operand is a memory or a register. The source operand field records the source operand. The source operand offset field records an offset amount of the source operand. The target operand format field records whether the target operand is a memory or a register. The target operand field records the target operand. The target operand offset field records an offset amount of the target operand.

In one embodiment, the computer system includes a loop register, a value of the loop register corresponds to a base page, and a plurality of virtual pages adjacent the base page includes a siding page. When the value of the loop register changes, the first core calculates the corresponding base page and the siding page according to the value of the loop register, and the first core further transmits the value of the loop register, the physical address of the base page, and the physical address of the siding page to the second core.

In one embodiment, the second core further calculates the addressing results of the dynamic addressing instructions including the loop register according to the value of the loop register, the physical address of the base page and the physical address of the siding page.

In one embodiment, the computer system utilizes IA-32 CPU architecture, and the loop register is an ebp register.

In one embodiment, the second core includes a bit mapping chart, and the second core records the address of a tainted memory, tainted register or tainted hard disk into the bit mapping chart during tracking the information flows.

In view of the foregoing, the computer system and tracking method provided by the present invention may divide the instructions into code blocks. The first core and the second core perform respective operations with each code block as a unit. As such, the amount of data transmission between the first core and the second core is reduced. In addition, the fire core transmits only the necessary information, such as, the addressing results, the value of the loop register, to the second core, thereby further reducing the amount of data transmission between the first core and the second core and hence enhancing the efficiency of tracking the information flows.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 4 illustrates categories of the instructions according to one embodiment of the present invention.

FIG. 9 illustrates a code for calculating the addressing result according to the loop register according to one embodiment of the present invention.

DESCRIPTION OF THE EMBODIMENTS

Figure 1:
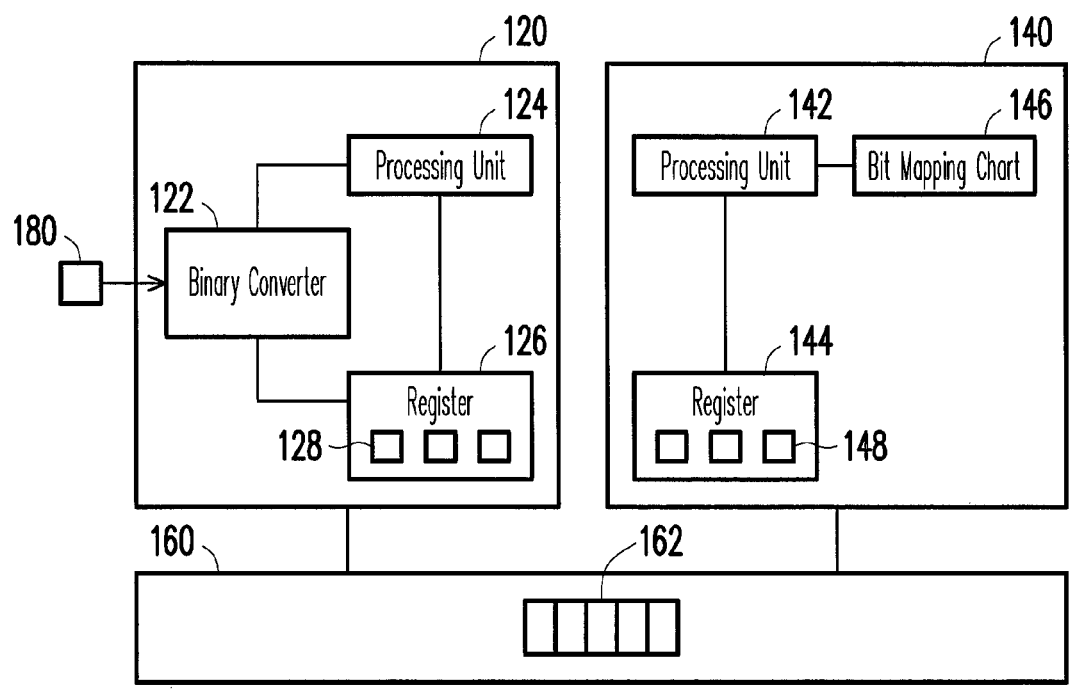
FIG. 1 is a block diagram of a computer system according to one embodiment of the present invention.

FIG. 1 is a block diagram of a computer system according to one embodiment of the present invention.

Referring to FIG. 1, the computer system 100 includes a first core 120, a second core 140, and a shared memory 160. The computer system 100 is used for executing a plurality of instructions 180 and tracking information flows of the instructions 180. In particular, the computer system 100 includes a first procedure and a second procedure (not shown). In the present invention, a task of tracking information flow is divided into parts that are executed by the first procedure and the second procedure. For example, the first procedure and the second procedure are two threads included in the computer system 100. In the present embodiment, the first procedure is executed by the first core 120, and the second procedure is executed by the second core 140. That is, the task of tracking information flow is performed by two cores, thereby enhancing efficiency. Notably, in the present embodiment, the description of tracking information flow is made with reference to the operations of the first core 120 and the second core 140, which is equivalent to describing how the first procedure and the second procedure track the information flow. That is, the first procedure includes steps performed by the first core 120, and the second procedure includes steps performed by the second core 140. On the other hand, the computer system 100 may include more cores. For load balance, the computer system 100 may execute the first procedure in a core outside the first core 120, and may also execute the second procedure in a core outside the second core 140. The present invention is not intended to limit the first procedure and the second procedure to be executed in a particular core. One feature of the embodiment is that the computer system 100 employs the first core 120 to execute the instructions 180 (when describing operations of the first core below, it equivalently describes the steps included in the first core) and employs the second core 140 to perform the tracking steps (when describing operations of the second core below, it equivalently describes the steps included in the second core).

Figure 2:
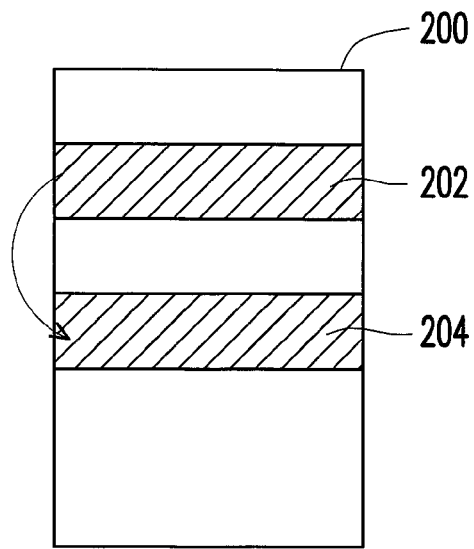
FIG. 2 illustrates a code block according to one embodiment of the present invention.

FIG. 2 illustrates the tracking of information flows according to one embodiment of the present invention.

Referring to FIG. 2, when the computer system 100 acquires data from a network and stores the data to a first portion 202 of a memory 200, the first portion 202 is marked as tainted, which indicates that the data in the first portion 202 may be unsafe. If the computer system 100 then executes some instructions such that the data in the first portion 202 is duplicated to a second portion 204, then the second portion 204 is also marked as tainted. The computer system 100 may also perform a calculation on the data in the first portion 202 and store the calculation result in the second portion 204. In this case, the second portion 204 is also marked as tainted. The present invention is not intended to limit how the second portion 204 is tainted. On the other hand, the data of the first portion 202 may also taint a register or a hard disk through execution of input/output (I/O) instructions. It is noted, however, that the above exemplary devices marked as tainted are intended to be illustrative rather than limiting. In the present invention, the course that the first portion 202 affects the second portion 204 is termed as information flow of the executed instruction.

Referring again to FIG. 1, in particular, the first core 120 translates the instructions into information flow codes in a specific format and transmits the information flow codes to the second core 140. These information flow codes correspond to the instructions 180, which include information associated with the information flow. The second core 140 is configured to execute these information flow codes to perform the steps of tracking the information flow. That is, in the present invention, the first core 120 and the second core 140 operate in parallel, such that the first core 120 is configured to execute the instructions 180, and the second core 140 is configured to track the information flows to which the instructions 180 correspond, thereby enhancing the efficiency of tracking the information flow.

Figure 3:
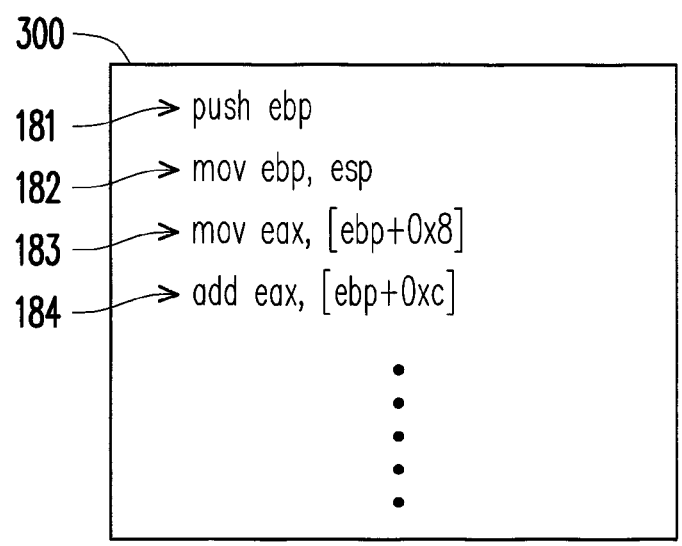
FIG. 3 illustrates a code block according to one embodiment of the present invention.

The first core 120 includes a binary converter 122, a processing unit 124 and a register 126. The binary converter 122 is used to receive the instructions 180 and divide the instructions 180 into at least one code block according to an executing sequence of the instructions 180. The computer system 100 executes the instructions 180 and emulates the information flows of the instructions 180 with each code block as a unit. FIG. 3 illustrates a code block according to one embodiment of the present invention. Referring to FIG. 3, the code block 300 includes a plurality of instructions. It is noted, however, that the present invention is not intended to limit the number of the instructions in one code block as well as the number of the code blocks divided from the instructions 180. The code block 300 includes a plurality of instructions including dynamic addressing instructions and static addressing instructions. The dynamic addressing instruction refers to such an instruction that its addressing can only be determined during an execution period. For example, the instruction 181, instruction 183 and instruction 184 are dynamic addressing instructions, addressing of which can only be determined during an execution period. On the other hand, the static addressing instruction refers to such an instruction that its addressing can be already determined during a compiling period. For example, the instruction 182 is a static addressing instruction.

The binary converter 122 further translates the instruction 180, with each code block as a unit, into information flow codes and transmits the information flow codes to the second core 140. On the other hand, the binary converter 122 further converts the instructions 180, with each code block as a unit, into dynamic emulation instructions 128 and stores the dynamic emulation instructions 128 to the register 126. The processing unit 124 is configured to execute the dynamic emulation instructions 128 to generate information associated with the code blocks and addressing results of the dynamic addressing, in which the execution of the dynamic emulation instructions 128 is equivalent to execution of the instructions 180. For example, when the processing unit 124 executes the dynamic emulation instructions 128, it generates the addressing results of the instructions 181, 183, 184. The information associated with the code blocks may include a serial number of each code block 300, which serial number is used to determine a sequence of executing the code blocks. The processing unit 124 further transmits the generated information associated with the code blocks and the addressing results to the second core 140.

The second core 140 includes a processing unit 142, a register 144 and a bit mapping chart 146. The second core 140 stores the received information flow codes 148 to the register 144. According to the received addressing results, the processing unit 142 executes the information flow codes to track information flows of the instructions 180. On the other hand, the processing unit 142 further stores the results of tracking information flows of the instructions 180 to the bit mapping chart 146. For example, the processing unit 142 stores the locations of the tainted memories, registers or hard disks to the bit mapping chart 146. For instance, the locations of each memory, each register or each hard disk of the computer system is denoted by a bit. For example, if the bit is "1", it indicates the corresponding location or register is marked as tainted. However, the present invention is not intended to limit the results to be stored in the bit mapping chart 146 in a particular manner. Rather, in other embodiments of the present invention, the locations of the tainted memories, hard disks or registers may be stored in the bit mapping chart 146 in another manner.

In one embodiment, the first core 120 transmits the addressing results of the dynamic addressing instructions to the shared memory 160, and the second core 140 retrieves these addressing results from the shared memory 160. For example, the shared memory 160 includes a data structure 162 which is a first-in-first-out (FIFO) queue. The first core 120 transmits the addressing results to the data structure 162, and the second core 140 retrieves the addressing results from the data structure 162. The first core 120 writes the addressing results to the data structure 162 in a sequence that accords with the sequence of executing the instructions 180. In addition, because the data structure 162 is the FIFO queue, the sequence of retrieving from the data structure 162 by the second core 120 also accords with the sequence of executing the instructions 180. However, in another embodiment, both the first core 120 and the second core 140 are coupled to a bus (not shown) through which the first core 120 transmits the addressing results to the second core 140. Therefore, the present invention is not intended to limit the method of transmitting the addressing results from the first core 120 to the second core 140.

In order to define the formats and contents of the dynamic emulation instructions 128 in detail, the present invention further classifies the instructions 180 into four categories and generates the information flow codes 148 according to the categories of the instructions 180. In the present embodiment, the computer system 100 utilizes IA-32 central processing unit (CPU) architecture in which the instructions 180 are included in an instruction set of the IA-32 CPU. However, the computer system 100 may also utilize another CPU architecture in another embodiment and the present invention has no limitations in this regard.

FIG. 4 illustrates the categories of the instructions according to one embodiment of the present invention.

Referring to FIG. 4, the instructions 180 are classified into four categories, i.e. byte-wise overwriting 410, byte-wise appending 420, incrementally mixed 430, and all mixed-up 440. Each category represents a manner of information flow. In the explanation below, A[i] denotes a byte of a target operand, B[i] denotes a byte of a source operand, where i represents a location of the byte in the operand and the value of ranges from 0 to n.

FIG. 5A to FIG. 5D illustrate the information flows of the instructions according to one embodiment of the present invention.

The instructions classified as byte-wise overwriting 410 include instructions for merely moving register or memory. That is, a byte of the source operand only affects a byte of the target operand at the same location. For example, B[0] only affects A[0], and B[n] only affects A[n]. If the category of the instructions is byte-wise overwriting 410, it is labeled as $\Leftarrow_n$.

Figure 5A:
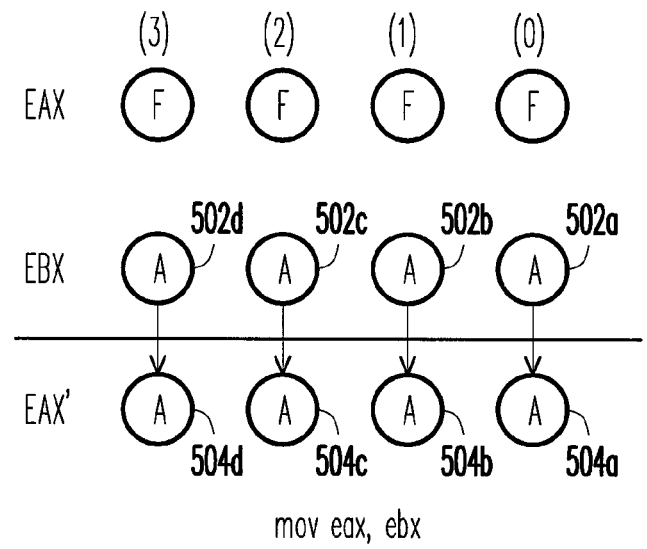
FIG. 5A to FIG. 5D illustrate information flows of the instructions according to one embodiment of the present invention.

Referring to FIG. 5A, the instruction "move eax, ebx" is to duplicate the value of register ebx to the register eax. For example, the register ebx is a 32-bit register including bytes 502a, 502b, 502c, and 502d. The register eax is also a 32-bit register including bytes 504a, 504b, 504c, and 504d. After executing the instruction "move eax, ebx", all bytes in the register ebx are duplicated to the corresponding bytes in the register eax. If the register ebx contains a tainted byte, then the register eax also contains a tainted byte. For example, assuming the byte 502a is a tainted byte, then after executing the instruction "move eax, ebx", the byte 504a also becomes a tainted byte. FIG. 5A uses arrows to represent the direction of information flows. For example, an arrow points from the byte 502a to the byte 504a, which indicates that the byte 502a affects the byte 504a.

Figure 5B:
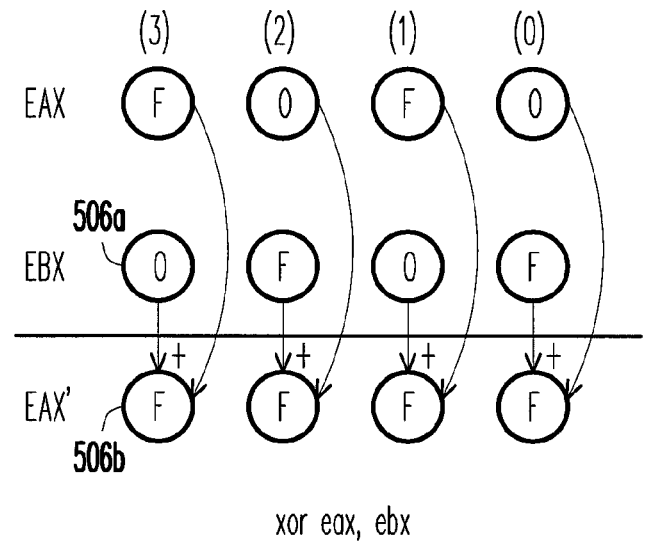

The instructions classified as byte-wise appending 420 include those having a target operand and a source operand that are the same. That is, A is a target operand as well as a source operand; A[0] is affected by both of A[0] and B[0]. For an instruction classified as byte-wise appending 420, it is labeled as $\overset{+}{\Leftarrow}_n$. Referring to FIG. 5B, the instruction "xor eax, ebx" is to perform an xor operation on the contents of the register eax and the register ebx and store the operation results to the register eax. Therefore, if the register ebx or the register eax contains a tainted byte, then the register eax also contains a tainted byte. FIG. 5B uses arrows to represent the direction of information flows. For example, assuming the byte 506a is a tainted byte, then after executing the instruction "xor eax, ebx", the byte 506b also becomes a tainted byte.

Figure 5C:
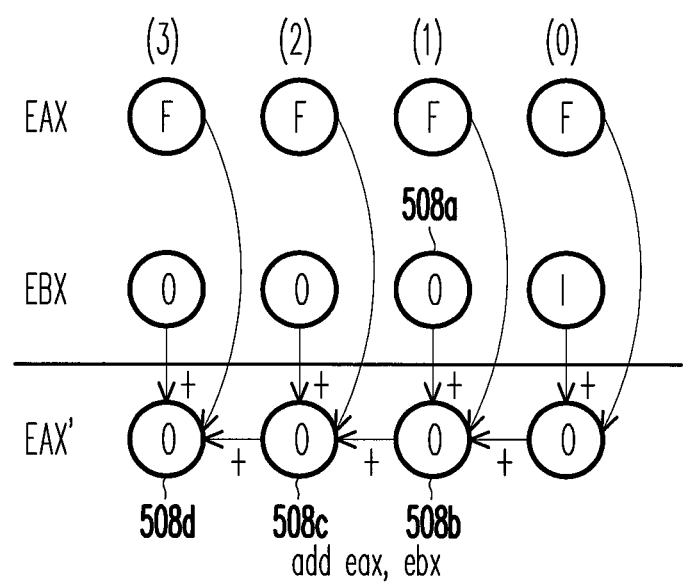

The instructions classified as incrementally mixed 430 include those in which a low byte affects a high byte. That is, the high byte A[n] is not only affected by B[n], it is affected by the low byte A[n−1] as well. For an instruction classified as incrementally mixed 430, it is labeled as $\overset{A}{\Leftarrow}_n$. If the register eax and register ebx contains a tainted byte, then the register eax also contains a tainted byte and the low byte taints the high byte. FIG. 5C uses arrows to represent the direction of information flows. For example, assuming the byte 508a is a tainted byte, then after executing the instruction "add eax, ebx", all the bytes 508b, 508c, 508d become tainted bytes.

Figure 5D:
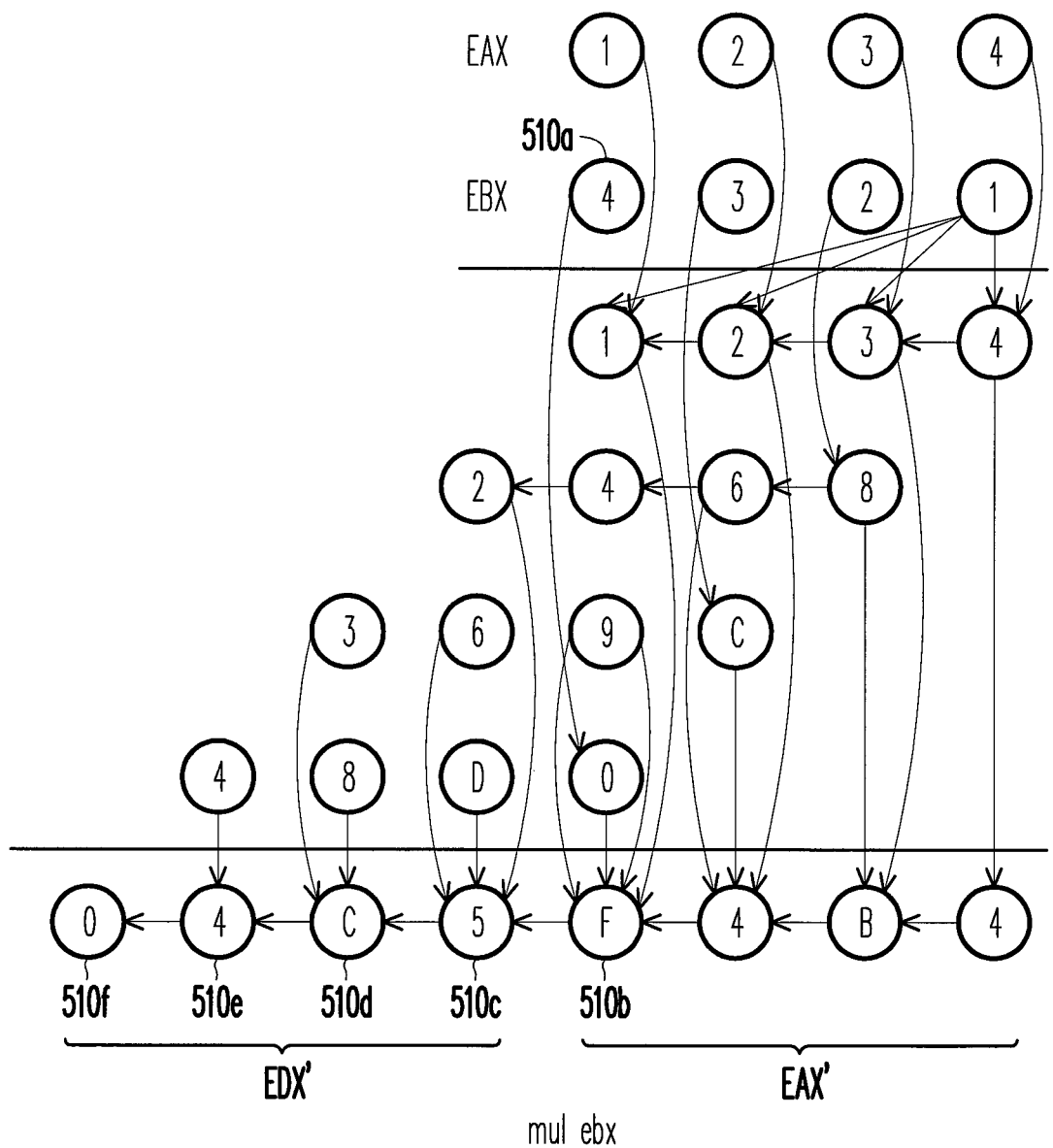

The instructions classified as all mixed-up 440 include those instructions other than byte-wise overwriting 410, byte-wise appending 420 and incrementally mixed 430. For an instruction classified as all mixed-up 440, it is marked as $\overset{..}{\Leftarrow}_n$. Referring to FIG. 5D, the instruction "mul ebx" is to multiply the value of the register eax and the value of the register ebx and store the multiplied results to the register eax and the register edx. It is noted that, because the register eax and the register ebx are each a 32-bit register, the multiplied result is of 64-bit which requires two registers for storage. FIG. 5D uses arrows to indicate the direction of information flows. For example, if the byte 510a of the register ebx is a tainted byte, then after executing the instruction "mul ebx", the bytes 510b, 510c, 510d, 510e and 510f all become tainted bytes. It is noted that some arrows are omitted in FIG. 5D for better readability.

It is noted that the above classification is exemplarily described with reference to registers. However, the instructions for accessing a memory may also be classified into the categories described above. For example, the instruction "move eax, [ebp+0x8]" is to obtain an addressing result by adding 0x8 to the value of the register ebp and retrieve data from a memory to the register eax according to the addressing result. The instruction "move ax, [ebp+0x8]" may be classified as byte-wise overwriting 410. If the memory corresponding to this addressing result contains a tainted byte, then the register eax also contains a tainted byte. On the other hand, the value of the register ebp can only be determined during the execution period. Therefore, the addressing result can only be determined during the execution period and the instruction "move ax, [ebp+0x8]" is thus a dynamic addressing instruction. In other embodiments, the instructions 180 may also include one for accessing any input/output (I/O) device (e.g. hard disk) in the computer system. Therefore, the I/O devices in the computer system are also possible to be tainted.

Having classified the instructions 180 into byte-wise overwriting 410, byte-wise appending 420, incrementally mixed 430 or all mixed-up 440, the binary converter 122 can then produce information flow codes in a specific format according to the categories of the instruction. The information flow codes include information associated with information flows of the instructions 180 (e.g. which location in the memory is to taint which register, or vice versa), and the second core 140 tracks the information flows of the instructions 180 by executing the information flow codes.

Figure 6A:
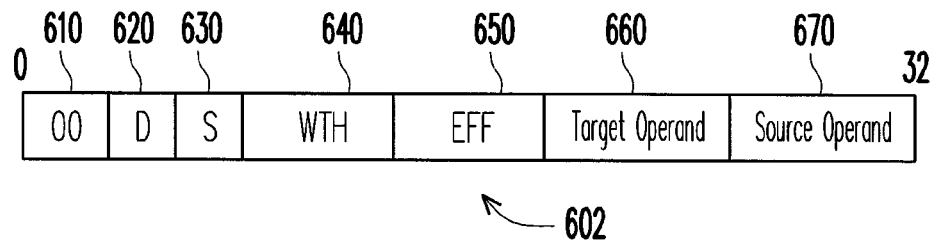
FIG. 6A illustrates a multi-byte format according to one embodiment of the present invention.

An information flow code may comply with a multi-byte format when a corresponding instruction processes multiple bytes at the same time. For example, the instruction "move eax, ebx" is to duplicate the four bytes in the register ebx to the four bytes in the register eax and may comply with a multi-byte format. FIG. 6A illustrates a multi-byte format according to one embodiment of the present invention. Referring to FIG. 6A, when an information flow code 602 complies with a multi-byte format, the information flow code 602 has a fixed length, e.g. 32 bits. The information flow code in the multi-byte format includes a header field 610, a target operand format field 620, a source operand format field 630, a width field 640, an effect field 650, a target operand field 660, and a source operand field 670.

The header field 610 records the format of the information flow code 602. For example, when the header field 610 is "00", it indicates that the information flow code 602 is in a multi-byte format.

The target operand format field 620 records whether the target operand is a register or a memory. For example, the target operand of the instruction "move ax, ebx" is the register eax and, therefore, "0" is written into the target operand format field 620 to indicate that the target operand is a register. If the target operand is a memory, then "1" is written into the target operand format field 620. The source operand format field 630 records whether the source operand is a register or a memory. The recording manner of the source operand format field 630 is similar to that of the target operand format field 620 and therefore explanation thereof is not repeated herein. However, the target operand format field 620 and the source operand format field 630 may also use other values to indicate whether a corresponding operand is a register or a memory, and the present invention has no limitations in this regard.

The width field 640 records the operation width of an operator. For example, the operator of the instruction "move ax, ebx" is "mov" which moves 32-bit data. Therefore, "11" is written into the width field 640, which indicates that the operation width of the operator is 32 bits. However, when the operation width of the operator is another width, another value may be written into the width field 640 to represent another operation width, and the present invention has no limitations in this regard. The effect field 650 records an operation category of an operator. For example, the operation category is byte-wise overwriting 410, byte-wise appending 420, incrementally mixed 430 or all mixed-up 440 (as shown in FIG. 4). Other values may be written into the effect field 650 to indicate other operation categories.

The target operand field 660 records the target operand. For example, the target operand of the instruction "move ax, ebx" is the register eax and, therefore, "0x0001" may be written into the target operand field 660 to represent the register eax. However, the register eax may be represented by other values, and the present invention has no limitation in this regard. The source operand field 670 records the source operand. The recording manner of the source operand field 670 is similar to that of the target operand field 660 and, therefore, explanation thereof is not repeated herein. That is, in a code block, both the source operand and the target operand can be presented by respective fixed values (e.g. "0x0001" represents the register eax). Therefore, in executing the information flow code 602, the second core 140 can access the source operand and the target operand according to the source operand field 670 and the target operand field 660.

As such, in executing the information flow code 602, the second core 140 may obtain the information associated with the information flow from the width field 640 and the effect field 650, without calculating the result of the instruction corresponding to the information flow code 602. For example, the information flow code 602 corresponds to the instruction "move ax, ebx", and in executing the information flow code 602, the second core 140 can be aware that the register eax may possibly be tainted by the register ebx, without calculating the result of the instruction "move ax, ebx". Further, the second core 140 includes the bit mapping chart 146 for tracking the locations of the tainted register, memory or hard disk. Therefore, the second core 140 can track the information flow of the instruction "move ax, ebx" by means of the information flow code 602. Notably, the instruction "move ax, ebx" is a static addressing instruction, i.e. the addressing of which can be determined during a compiling period. Therefore, while the second core 140 is tracking the instruction "move ax, ebx", the first core 120 and the second core 140 do not need to transmit any information therebetween. As such, the amount of information that needs to be transmitted between the first core 120 and the second core 140 is reduced, which enables the computer system 100 to more efficiently track the information flows of the instructions 180.

However, the instructions 180 may include some special instructions such as an instruction for duplicating a lowest byte of the register eax to a highest byte of the register ebx. Instructions similar to this cannot be represented by information flow codes in the multi-byte format. Therefore, in the present invention, the information flow codes may possibly comply with a single-byte format, which can deal with any type of information flows.

Figure 6B:
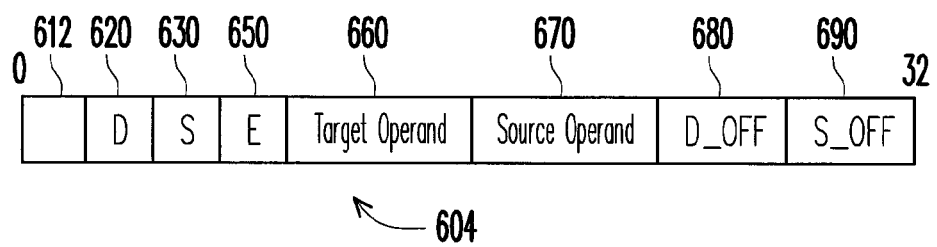
FIG. 6B and FIG. 6C illustrate a single-byte format according to one embodiment of the present invention.
Figure 6C:
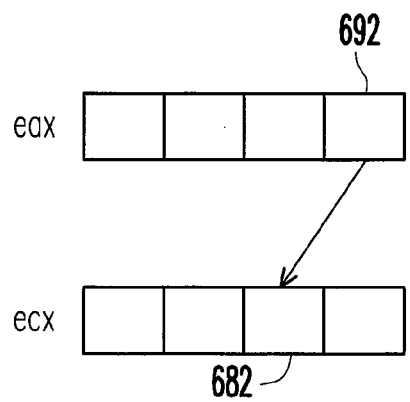

FIG. 6B and FIG. 6C illustrate a single-byte format according to one embodiment of the present invention.

Referring to FIG. 6B, when an information flow code 604 complies with a single-byte format, the information flow code 604 has a fixed length, for example, 32 bits. The information flow code 604 includes a header field 612, a target operand format field 620, a source operand format field 630, an effect field 650, a target operand field 660, a source operand field 670, a target operand offset field 680, and a source operand offset field 690. The target operand format field 620, source operand format field 630, effect field 650, target operand field 650 and source operand field 670 have been described above in detail and, therefore, explanation thereof is not repeated herein.

The header field 612 records the format of the information flow code 604. For example, when the header field 612 is "01", it indicates that the information flow code 604 is a single-byte format.

The target operand offset field 680 records an offset amount of the target operand. The source operand offset field 690 records an offset amount of the source operand. For example, the information flow code 604 corresponds to the instruction "mov ch, al" for duplicating a byte 692 of the register eax to a byte 682 of the register 682 (as shown in FIG. 6C). That is, the offset amount of the byte 692 is not equal to the offset amount of the byte 682. In this example, the offset amount is calculated with respect to the least significant bit (LSB). Therefore, "0x0001" is written into the target operand offset field 680 to indicate that the offset amount of the byte 682 is one byte; "0x0000" is written into the source operand offset field 690 to indicate that the offset amount of the byte 692 is zero byte. However, in other embodiments, the offset amount may also be calculated with respect to the most significant bit (MSB), the target operand offset field 680 and the source operand offset field 690 may use other values to indicate the offset amount, and the present invention has no limitations in this regard.

By executing the information flow codes in the single-byte format and multi-byte format, the second core 140 can therefore track the information flows of the corresponding static addressing instructions. However, if the information flow codes correspond to the dynamic addressing instructions such as the instruction "mov eax, [ebp+0x8]", then the second core 140 further needs the addressing result of this instruction (i.e. the calculating result of ebp+0x8) to track the information flow of this instruction.

Referring again to FIG. 1, by executing the dynamic emulation instructions 128, the first core 120 generates the addressing results and the information associated with the code blocks, which are needed by the second core 140.

Figure 7:
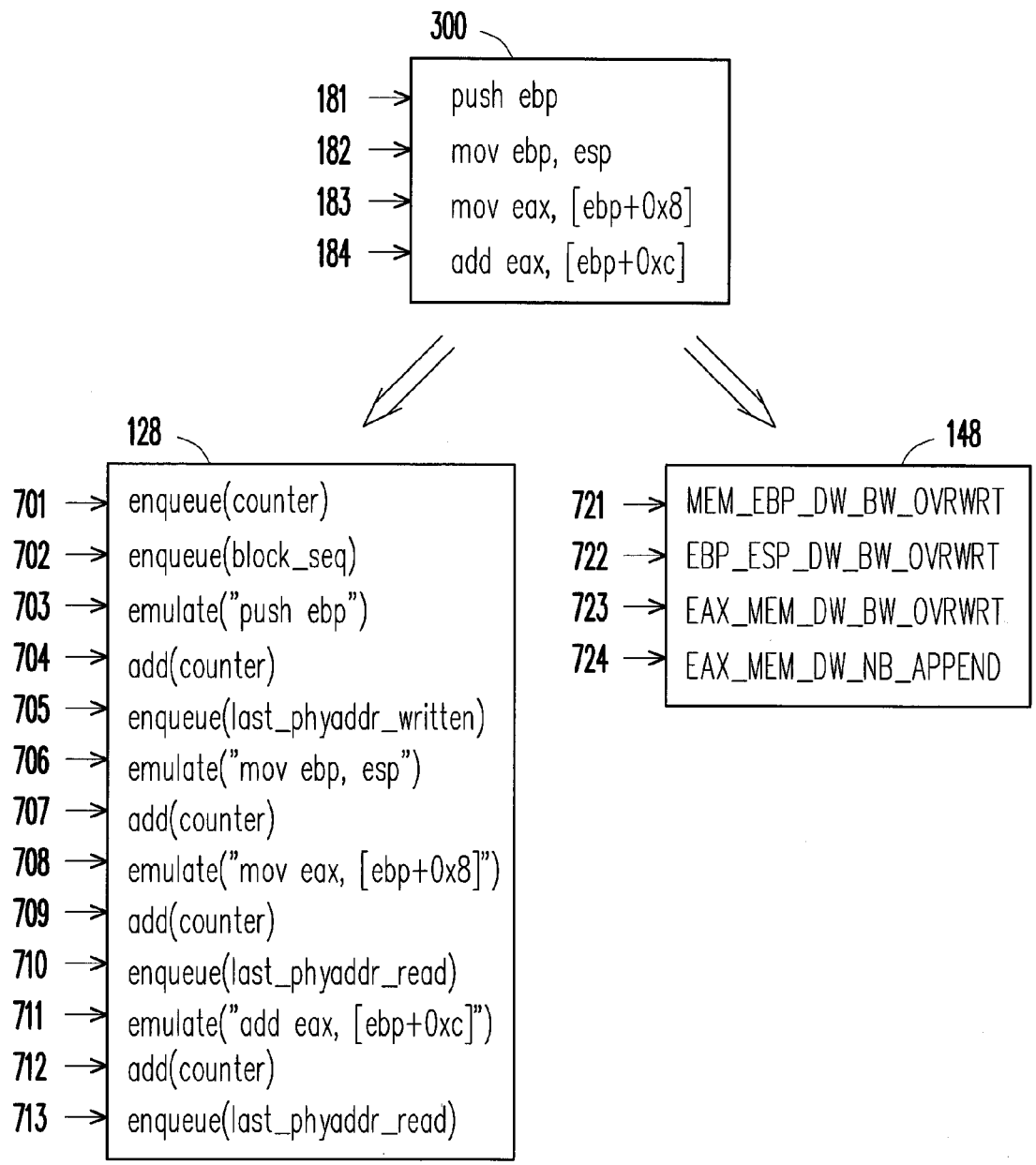
FIG. 7 illustrates the instructions, dynamic emulation instructions and information flow codes according to one embodiment of the present invention.

FIG. 7 illustrates the instructions, dynamic emulation instructions and information flow codes according to one embodiment of the present invention.

Referring to FIG. 7, the binary converter 122 converts the instructions 181 to 184, with each code block 300 as a unit, into dynamic emulation instructions 128 and information flow codes 148. The dynamic emulation codes 128 are executed by the first core 120, and the information flow codes 148 are executed by the second core 140. The dynamic emulation instructions 128 includes an instruction number transmitting instruction, a block serial number transmitting instruction, emulation executing instructions, counting instructions, and addressing result transmitting instruction.

The emulation executing instructions 703, 706, 708, 711 correspond to the instructions 181, 182, 183, 184, respectively. When the first core 120 executes the emulation executing instructions, it is equivalent to execution of the corresponding instructions. In addition, when the executed emulating execution instruction is a dynamic addressing instruction, the first core 120 generates a corresponding addressing result. For example, when the first core 120 executes the emulation executing instruction 708, it is equivalent to execution of the instruction 183 and the addressing result (i.e. the calculating result of epb+0x8) of the instruction 183 is generated. Likewise, when the first core 120 executes the emulation executing instruction 711, it is equivalent to execution of the instruction 184 and the addressing result (i.e. the calculating result of ebp+0xc) of the instruction 184 is generated.

The addressing result transmitting instruction transmits an addressing result to the second core 140 after an emulation executing instruction to which a dynamic addressing instruction corresponds is executed. For example, the instructions 181, 183, 184 are dynamic addressing instructions, and they correspond to the emulation executing instructions 703, 708, 711, respectively. The addressing result transmitting instructions 705, 710, 713 transmit the addressing results of the instructions 181, 183, 184 to the second core 140 after the emulation executing instructions 703, 708, 711 are executed, respectively.

The counting instructions 704, 707, 709, 712 calculate the number of the emulation executing instructions that have been successfully executed by the first core 120 after the emulation executing instructions 703, 706, 708, 711 are executed, respectively. For example, the counting instruction 704 increases the number of instructions by one after the emulation executing instruction 703 is executed. In this example, the number of instructions is represented by a variable "counter". Likewise, the counting instruction 712 increases the number of instructions by one after the emulation executing instruction 711 is executed. In other words, the number of the instructions (e.g. the variable "counter") refers to the number of the emulation executing instructions that have been successfully executed by the first core 120.

The instruction number transmitting instruction 701 is a frontmost in the dynamic emulation instructions 128 to transmit the number of the instructions (e.g. the variable "counter") to the second core 140. This number of the instructions refers to the number of the emulation executing instructions that have been successfully executed by the first core 120 till a previous emulation executing instruction (not shown) is executed. Execution of any code may possibly encounter an exception, such as, a page fault or interruption by another I/O device. Therefore, transmitting the number of the instructions to the second core 140 enables the second core 140 to be aware of the current executing status of the first core 120 (e.g., how many emulation executing instructions have been successfully executed by the first core).

The block serial number transmitting instruction 702 transmits the block serial numbers of the code blocks to which the dynamic emulation instructions 128 correspond. That is, after dividing the instructions 180 into at least one code block, the binary converter 122 associates each code block with a bock serial number (e.g. the variable "block_seq"), and the block serial number of each code block is unique. When the first core 120 executes the block serial number transmitting instruction 702, the first core 120 transmits the corresponding block serial number (e.g. the variable "block_seq") to the second core 140. As such, according to this block serial number, the second core 140 can obtain a correct sequence of the code block and the correct information flow codes 148 from the register 144.

In this embodiment, the first core 120 transmits the addressing results, the number of the instructions and the block serial numbers to the data structure 162 of the shared memory 160. That is, the first core 120 writes data into the data structure 162 using the enqueue instructions. The second core 140 retrieves desired data from the data structure 162 using the dequeue instructions. However, in other embodiments, the first core 120 can transmit data to the second core 140 through a bus (not shown) and the present invention has no limitations in this regard.

On the other hand, the information flow codes 721, 722, 723, 724 correspond to the instructions 181, 182, 183, 184, respectively. When executing the information flow codes, the second core 140 can therefore track the information flows of the instructions. For example, when executing the information flow 723, the second core 140 can track the information flow of the instruction 183. Notably, because the instruction 183 is a dynamic addressing instruction, the second core 140 further needs the addressing result of the instruction 183. However, as described above, when executing the dynamic emulation instruction 710, the first core 183 has already transmitted the addressing result of the instruction 183 to the second core 140 and, as such, the second core 140 can correctly track the information flow of the instruction 183. The contents and formats of the information flow codes 721 to 724 have been described above and therefore explanation thereof is not repeated herein.

Notably, the present invention emulates the information flows of the instructions with each code block as a unit. Because each transmission transmits larger-sized data, the transmission efficiency of the present invention is enhanced in comparison with multi-transmissions with each transmission transmitting smaller-sized data. Therefore, it is after the first core 120 translates the instructions of one code block into dynamic emulation instructions and information flow codes that the first core 120 translates the information flow codes of the code block to the second core 140. As such, times of data transmission between the first core 120 and the second core 140 are reduced.

Besides, the first core 120 further transmits a value of a loop register to the second core 140. In one embodiment, the computer system 100 utilizes the IA-32 CPU architecture in which the ebp register is the loop register. In the IA-32 architecture, a compiler (not shown) often uses the register ebp for addressing of a loop. For example, the instruction 183 (i.e. "mov eax, ebp+0x8") is a common instruction. In such architecture, the value of the ebp register does not frequently change. The compiler adds an offset value (e.g. 0x8) to the register ebp to achieve the addressing result. In addition, the scope of the offset value does not exceed a predetermined scope.

Figure 8A:
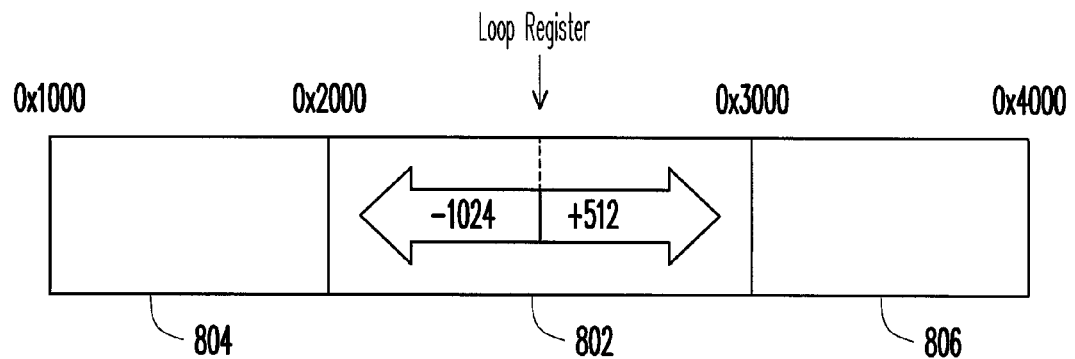
FIG. 8A to FIG. 8C illustrate an offset value of the loop register according to one embodiment of the present invention.
Figure 8B:
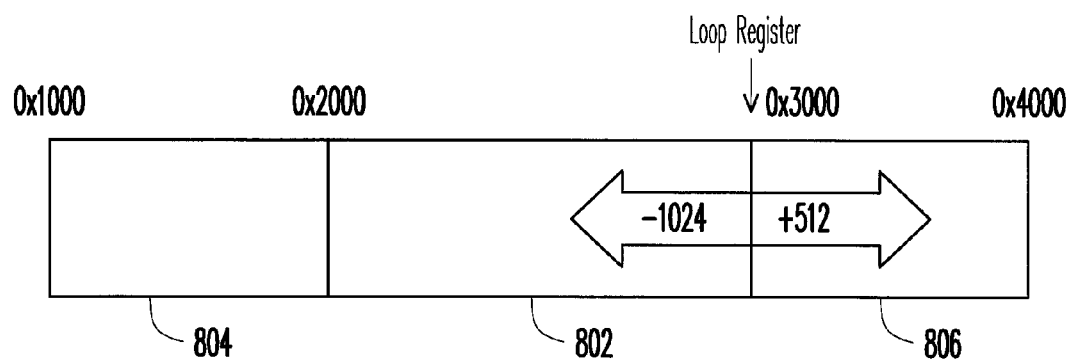
Figure 8C:
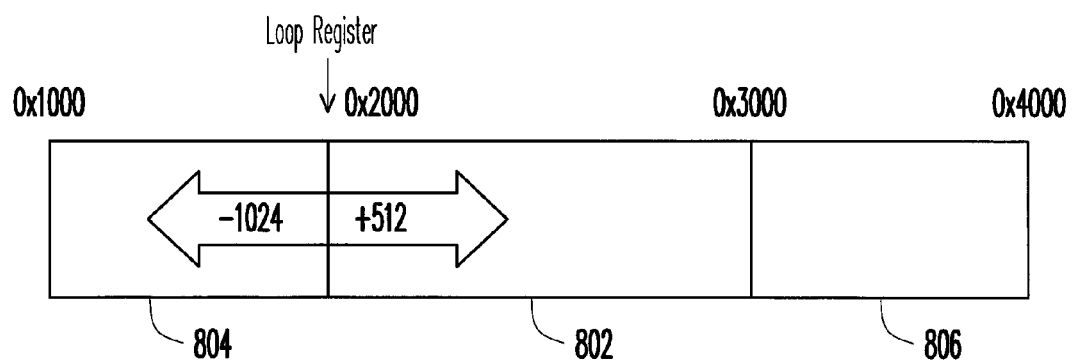

FIG. 8A to FIG. 8C illustrate an offset value of a loop register according to one embodiment of the present invention.

Statistical results show that the offset value of the loop register mostly range between −1024 and +512 bytes. This is because codes generally have a characteristic of locality of reference, such that the memory used by the codes also has the locality characteristic. Referring to FIG. 8A, if a memory page pointed to by the value of the loop register (e.g. the ebp register) is a virtual page 802, and the scope of the offset value does not exceed the scope of the virtual page 802, the addressing result can be calculated by adding the offset value to the value of the ebp register. It is noted that the value of the ebp register refers to a virtual address, while the desired addressing result during the execution period is a physical address. Because the sum of the value of the loop register and the offset value does not exceed the scope of the virtual page 802, only a physical address of the virtual page 802 is needed to calculate the addressing result.

Referring to FIG. 8B, if the value of the loop register points to an edge of the virtual page 802, the result of adding the offset value to the value of the loop register may possibly exceed the scope of the virtual page 802, which may, for example, include a virtual page 806. Besides, although the virtual address calculated by adding the offset value to the value of the loop register is continuous, it may correspond to different physical addresses. That is, the virtual page 802 and virtual page 806 may correspond to different physical addresses. In this case, the calculation of the addressing result would need the physical address of the virtual page 806 as well as the physical address of the virtual page 802. Referring to FIG. 8C, if the value of the loop register points to another edge of the virtual page 802, the result of adding the offset value to the value of the loop register may possibly exceed the scope of the virtual page 802, which may, for example, include a virtual page 804. In this case, the calculation of the addressing result would need the physical address of the virtual page 804 as well as the physical address of the virtual page 802.

It is noted that although both the addressing results of FIG. 8B and FIG. 8C include different virtual pages, the number of the corresponding virtual pages does not exceed two because of the limited scope of the offset value. Therefore, the present inventions sets the virtual page pointed to by the loop register as a base page and determines an adjacent virtual page to be a siding page according to the address of the value of the loop register in the base page. For example, when the loop register points to an address as shown in FIG. 8B, the virtual page 802 is set as the base page and the virtual page 806 is set as the siding page. On the other hand, when the loop register points to an address as shown in FIG. 8C, the virtual page 802 is set as the base page and the virtual page 804 is set as the siding page. That is, the siding page is surely one of the two virtual pages adjacent the base page. The first core 120 transmits the value of the loop register, the physical address of the base page and the physical address of the siding page to the second core 140. The second core 140 can determine whether the result of adding the offset value to the value of the loop register exceeds the scope of the base page and calculate the addressing result according to the physical addresses of the base page and the siding page.

FIG. 9 illustrates codes for calculating the addressing result according to the loop register in accordance with one embodiment of the present invention.

Referring to FIG. 9, in this embodiment the ebp register is taken as an example of the loop register. "offset" is the offset value, "paddr_base" is the physical address of the base page, and "paddr_siding" is the physical address of the siding page. The code 901 determines whether the result of adding the offset value to the ebp register exceeds the scope of the virtual page pointed to by the ebp register. If it exceeds the scope, the code 902 calculates a location of the virtual page according to a sum of the ebp register and the offset value, and calculates an addressing result on the basis of a physical address of a siding page. If it is determined that the result of adding the offset value to the ebp register does not exceed the scope of the virtual page pointed to by the ebp register, the addressing result is calculated on the basis of the physical address of the base page. More specifically, if the value of the ebp register is 0x2fff, then the first core 120 can determine the virtual page 802 to be the base page and the virtual page 806 to be the siding page (as shown in FIG. 8B). If the offset value is −3, the result of adding the offset value to the value of the ebp register is address 0x2ffc, which does not exceed the scope of the base page (e.g. 0x2000 to 0x2fff). In this case, the addressing result is calculated on the basis of the physical address of the virtual page 802. For example, the mask for translation between virtual and physical addresses is 0xf000, the shift of the address 0x2ffc relative to the physical address of the base page is 0x0ffc, and the correct addressing result can be obtained by adding 0x0ffc to the physical address of the base page. On the other hand, if the offset value is 3, the result of adding the offset value to the value of the ebp register is 0x3002, which exceeds the scope of the base page, and the addressing result calculation is based on the siding page. For example, the result of a mask operation on the address 0x3002 is 0x0002, and the addressing result can be obtained by adding 0x0002 to the physical address of the siding page (e.g. the virtual page 806).

As such, when an information flow code executed by the second core 140 correspond to a dynamic addressing instruction including the loop register, the second core 140 can calculate the addressing result according to the value of the loop register, the physical address of the base page and the physical address of the siding page. Therefore, the addressing result of the dynamic addressing instruction including the loop register does not need to be transmitted between the first core 120 and the second core 140, thereby enhancing the efficiency of tracking the information flow. Instead, the first core 120 needs only to transmit the value of the loop register, the physical address of a corresponding base page, and the physical address of a corresponding siding page to the second core 140. In addition, the value of the loop register does not frequently change and, therefore, the above transmission does not occur frequently.

On the other hand, the present invention further provides a method for tracking information flow.

Figure 10:
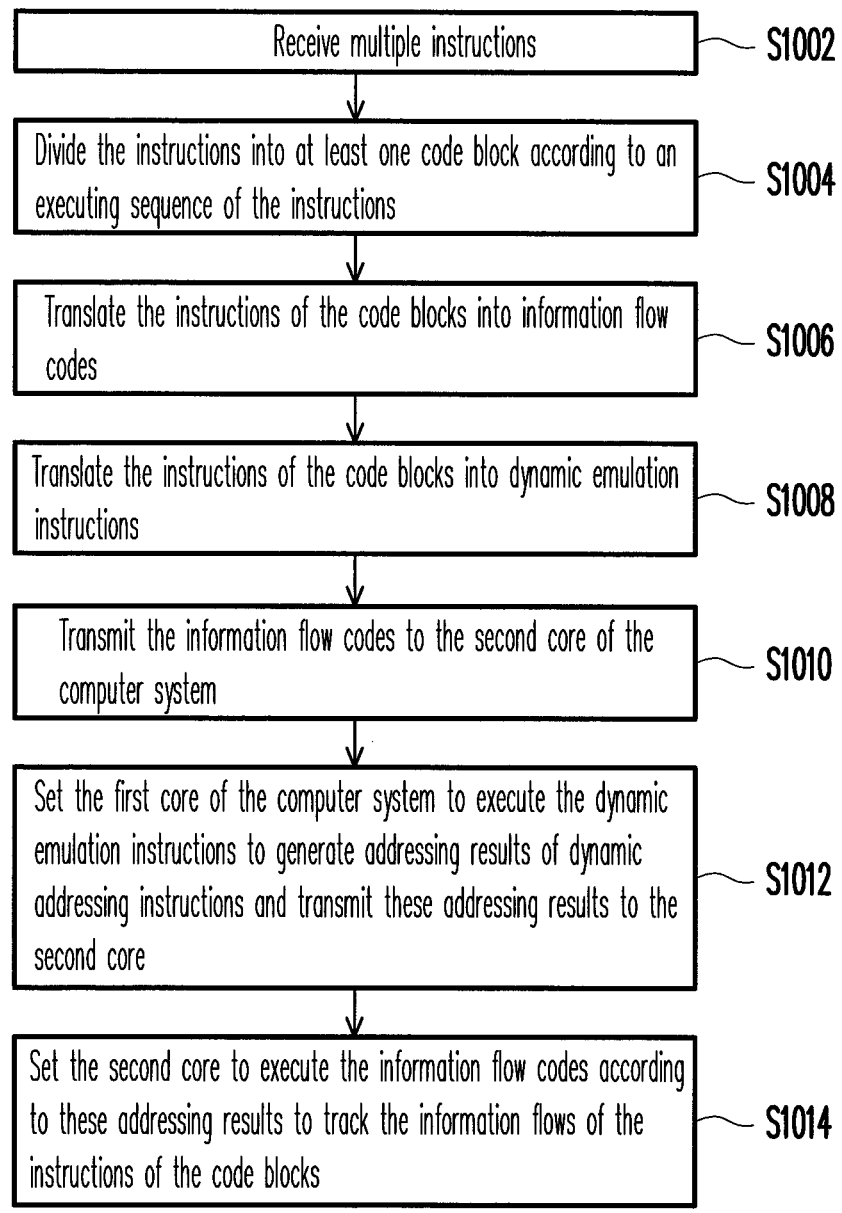
FIG. 10 is a flow chart of the tracking method according to one embodiment of the present invention.

FIG. 10 is a flow chart of a tracking method according to one embodiment of the present invention.

At step S1002, multiple instructions are received. The instructions are divided into at least one code block according to an executing sequence of the instructions (step S1004). The instructions of the code blocks are then translated into information flow codes (step S1006) and the instructions of the code blocks are translated into dynamic emulation instructions (step S1008).

Further, at step S1010, the information flow codes are transmitted to the second core of the computer system. At step S1012, the first core of the computer system is then set to execute the dynamic emulation instructions to generate addressing results of dynamic addressing instructions and transmit these addressing results to the second core. At step S1014, the second core is set to execute the information flow codes according to these addressing results to track the information flows of the instructions of the code blocks.

The steps of this tracking method have been described above in detail and therefore explanation thereof is not repeated herein.

In summary, the computer system and method for tracking information flow provided by embodiments of the present invention enable the first core and the second core of the computer system to operate in parallel. The instructions are divided into code blocks, such that the times of transmission between the two cores are reduced. In addition, because of the design of information flow codes and dynamic emulation instructions, the two cores need only to transmit dynamic addressing results therebetween. Besides, the value of the loop register needs to be transmitted to the second core only when it is changed, which further reduces the amount of data transmission between the two cores. For these reasons, the computer system can track the information flows of the instructions with enhanced efficiency. Besides the advantage of parallel operation, the present invention can also eliminate the two main drawbacks of the conventional coupled task of dynamic information flow, i.e. cache miss and poor code translation quality, thereby increasing the performance by over two times.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A decoupled method for tracking information flow, adapted for a computer system comprising a first procedure and a second procedure, the method comprising:
receiving multiple instructions by the first procedure;

dividing the instructions into at least one code block according to an executing sequence of the instructions by the first procedure, the instructions of the at least one code block comprising a plurality of dynamic addressing instructions and a plurality of static addressing instructions;

translating the instructions of the at least one code block into a plurality of information flow codes of the at least one code block by the first procedure, the information flow codes corresponding to the instructions of the at least one code block;

translating the instructions of the at least one code block into a plurality of dynamic emulation instructions of the at least one code block by the first procedure;

transmitting the information flow codes to the second procedure of the computer system by the first procedure;

generating a plurality of addressing results of the dynamic addressing instructions by executing the dynamic emulation instructions and transmitting the addressing results to the second procedure by the first procedure; and setting the second procedure to execute the information flow codes to track a plurality of information flows of the instructions of the at least one code block according to the addressing results, wherein the information flow codes comply with a multi-byte format, the multi-byte format comprising:

a source operand format field for recording whether a source operand is a memory or a register;

a target operand format field for recording whether a target operand is a memory or a register;

a width field for recording an operation width of an operator;

an effect field for recording an operation type of the operator;

a source operand field for recording the source operand; and a target operand field for recording the target operand.

2. The decoupled method for tracking information flow according to claim 1, wherein the computer system comprises a shared memory, the shared memory comprises a data structure which is a first-in-first-out queue, and the step of transmitting the addressing results to the second procedure of the computer system by the first procedure comprises:

writing the addressing results into the data structure by the first procedure; and retrieving the addressing results from the data structure by the second procedure.

3. The decoupled method for tracking information flow according to claim 1, wherein the dynamic emulation instructions of the at least one code block comprise a plurality of emulation executing instructions, the emulation executing instructions corresponding to the instructions of the at least one code block, and execution of the emulation executing instructions by the first procedure is equivalent to execution of the corresponding instructions and generates the addressing results of the dynamic addressing instructions.

4. The decoupled method for tracking information flow according to claim 3, wherein the dynamic emulation instructions of the at least one code block comprise a plurality of addressing result transmitting instructions, and execution of the addressing result transmitting instructions by the first procedure transmits the addressing results to the second procedure.

5. The decoupled method for tracking information flow according to claim 3, wherein the dynamic emulation instructions of the at least one code block comprise a plurality of counting instructions, execution of the counting instructions by the first procedure calculates a number of the instructions, and the number of the instructions is the number of the emulation executing instructions of the at least one code block that have been successfully executed.

6. The decoupled method for tracking information flow according to claim 5, wherein the dynamic emulation instructions of the at least one code block comprise an instruction number transmitting instruction, and execution of the instruction number transmitting instruction by the first procedure transmits the number of the instructions to the second procedure.

7. The decoupled method for tracking information flow according to claim 6, wherein the dynamic emulation instructions of the at least one code block comprise a block serial number transmitting instruction, and execution of the block serial number transmitting instruction by the first procedure transmits a block serial number of the at least one code block to the shared memory.

8. The decoupled method for tracking information flow according to claim 7, wherein the step of executing the information flow codes according to the addressing results by the second procedure comprises:

determining a sequence of tracking the information flows of the at least one code block according to the block serial number by the second procedure; and tracking the information flows of the at least one code block according to the number of the instructions by the second procedure.

9. The decoupled method for tracking information flow according to claim 1, wherein the computer system comprises a loop register, a value of the loop register corresponds to a base page, a plurality of virtual pages adjacent the base page comprises a siding page, and the tracking method further comprises:

when the value of the loop register changes, calculating the corresponding base page and the siding page by the first procedure according to the value of the loop register; and transmitting the value of the loop register, the physical address of the base page, and the physical address of the siding page to the second procedure by the first procedure.

10. The decoupled method for tracking information flow according to claim 9, comprising:

calculating the addressing results of the dynamic addressing instructions comprising the loop register by the second procedure according to the value of the loop register, the physical address of the base page and the physical address of the siding page.

11. The decoupled method for tracking information flow according to claim 10, wherein the computer system utilizes IA-32 CPU architecture, and the loop register is an ebp register.

12. The decoupled method for tracking information flow according to claim 1, wherein the computer system comprises a bit mapping chart, and the tracking method further comprises:

recording the addresses of a tainted memory, a tainted register or a tainted hard disk into the bit mapping chart by the second procedure during tracking the information flows.

13. A computer system for tracking information flow, comprising:

a first core for receiving multiple instructions and dividing the instructions into at least one code block according to an executing sequence of the instructions, the instructions of the at least one code block comprising a plurality of dynamic addressing instructions and a plurality of static addressing instructions; and a second core coupled to the first core;

wherein the first core translates the instructions of the at least one code block into a plurality of information flow codes of the at least one code block, the information flow codes corresponding to the instructions of the at least one code block;

wherein the first core translates the instructions of the at least one code block into a plurality of dynamic emulation instructions of the at least one code block;

wherein the first core transmits the information flow codes to the second core;

wherein the first core generates a plurality of addressing results of the dynamic addressing instructions by executing the dynamic emulation instructions and transmits the addressing results to the second core; and wherein the second core executes the information flow codes to track a plurality of information flows of the instructions of the at least one code block according to the addressing results, wherein the information flow codes comply with a multi-byte format, and the multi-byte format comprises:
  a source operand format field for recording whether a source operand is a memory or a register;
  a target operand format field for recording whether a target operand is a memory or a register;
  a width field for recording an operation width of an operator;
  an effect field for recording an operation type of the operator;
  a source operand field for recording the source operand; and
  a target operand field for recording the target operand.

14. The computer system according to claim 13, further comprising:
  a shared memory coupled to the first core and the second core, the shared memory comprising a data structure which is a first-in-first-out queue, wherein the first core writes the addressing results into the data structure; and the second core retrieves the addressing results from the data structure.

15. The computer system according to claim 13, wherein the dynamic emulation instructions of the at least one code block comprise a plurality of emulation executing instructions, the emulation executing instructions correspond to the instructions of the at least one code block, and execution of the emulation executing instructions by the first core is equivalent to execution of the corresponding instructions and generates the addressing results of the dynamic addressing instructions.

16. The computer system according to claim 15, wherein the dynamic emulation instructions of the at least one code block comprise a plurality of addressing result transmitting instructions, and execution of the addressing result transmitting instructions by the first core transmits the addressing results to the second core.

17. The computer system according to claim 16, wherein the dynamic emulation instructions of the at least one code block comprise a plurality of counting instructions, execution of the counting instructions by the first core calculates a number of the instructions, and the number of the instructions is the number of the emulation executing instructions of the at least one code block that have been successfully executed.

18. The computer system according to claim 17, wherein the dynamic emulation instructions of the at least one code block comprise an instruction number transmitting instruction, and execution of the instruction number transmitting instruction by the first core transmits the number of the instructions to the second core.

19. The computer system according to claim 18, wherein the dynamic emulation instructions of the at least one code block comprise a block serial number transmitting instruction, and execution of the block serial number transmitting instruction by the first core transmits a block serial number of the at least one code block to the shared memory.

20. The computer system according to claim 19, wherein the second core determines a sequence of tracking the information flows of the at least one code block according to the block serial number; and the second core tracks the information flows of the at least one code block according to the number of the instructions.

21. The computer system according to claim 13, wherein the computer system comprises a loop register, a value of the loop register corresponds to a base page, a plurality of virtual pages adjacent the base page comprises a siding page, when the value of the loop register changes, the first core calculates the corresponding base page and the siding page according to the value of the loop register, and the first core transmits the value of the loop register, the physical address of the base page, and the physical address of the siding page to the second core.

22. The computer system according to claim 21, wherein the second core calculates the addressing results of the dynamic addressing instructions comprising the loop register according to the value of the loop register, the physical address of the base page and the physical address of the siding page.

23. The computer system according to claim 22, wherein the computer system utilizes IA-32 CPU architecture, and the loop register is an ebp register.

24. The computer system according to claim 13, wherein the second core comprises a bit mapping chart, and the second core records the addresses of a tainted memory, tainted register or tainted hard disk into the bit mapping chart during tracking the information flows.

25. A decoupled method for tracking information flow, adapted for a computer system comprising a first procedure and a second procedure, the method comprising:
  receiving multiple instructions by the first procedure;
  dividing the instructions into at least one code block according to an executing sequence of the instructions by the first procedure, the instructions of the at least one code block comprising a plurality of dynamic addressing instructions and a plurality of static addressing instructions;
  translating the instructions of the at least one code block into a plurality of information flow codes of the at least one code block by the first procedure, the information flow codes corresponding to the instructions of the at least one code block;
  translating the instructions of the at least one code block into a plurality of dynamic emulation instructions of the at least one code block by the first procedure;
  transmitting the information flow codes to the second procedure of the computer system by the first procedure;
  generating a plurality of addressing results of the dynamic addressing instructions by executing the dynamic emulation instructions and transmitting the addressing results to the second procedure by the first procedure; and
  setting the second procedure to execute the information flow codes to track a plurality of information flows of the instructions of the at least one code block according to the addressing results, wherein the information flow codes comply with a single-byte format, the single-byte format comprising:
an effect field for recording an operation type of an operator;
a source operand format field for recording whether a source operand is a memory or a register;
a source operand field for recording the source operand;
a source operand offset field for recording an offset amount of the source operand;
a target operand format field for recording whether the target operand is a memory or a register;
a target operand field for recording the target operand; and
a target operand offset field for recording an offset amount of the target operand.

26. A computer system for tracking information flow, comprising:
a first core for receiving multiple instructions and dividing the instructions into at least one code block according to an executing sequence of the instructions, the instructions of the at least one code block comprising a plurality of dynamic addressing instructions and a plurality of static addressing instructions; and
a second core coupled to the first core;
wherein the first core translates the instructions of the at least one code block into a plurality of information flow codes of the at least one code block, the information flow codes corresponding to the instructions of the at least one code block;
wherein the first core translates the instructions of the at least one code block into a plurality of dynamic emulation instructions of the at least one code block;
wherein the first core transmits the information flow codes to the second core;
wherein the first core generates a plurality of addressing results of the dynamic addressing instructions by executing the dynamic emulation instructions and transmits the addressing results to the second core; and
wherein the second core executes the information flow codes to track a plurality of information flows of the instructions of the at least one code block according to the addressing results, wherein the information flow codes comply with a single-byte format, and the single-byte format comprises:
an effect field for recording an operation type of an operator;
a source operand format field for recording whether a source operand is a memory or a register;
a source operand field for recording the source operand;
a source operand offset field for recording an offset amount of the source operand;
a target operand format field for recording whether the target operand is a memory or a register;
a target operand field for recording the target operand; and
a target operand offset field for recording an offset amount of the target operand.

* * * * *